United States Patent [19]

Brugmans

[11] 4,370,377

[45] Jan. 25, 1983

[54] METALLIZED LABELS FOR CONTAINERS

[75] Inventor: Johannes T. Brugmans, Enkhuizen, Netherlands

[73] Assignee: Koninklijke Emballage Industrie Van Leer B.V., Amstelveen, Netherlands

[21] Appl. No.: 213,682

[22] Filed: Dec. 5, 1980

[30] Foreign Application Priority Data

Jul. 1, 1980 [NL] Netherlands .......................... 8003810

[51] Int. Cl.$^3$ .......................... B32B 5/16; B32B 27/00; C09J 7/02
[52] U.S. Cl. ..................................... 428/327; 428/354; 428/344; 428/355; 428/402; 428/497; 428/464; 428/458; 428/461; 428/460; 428/332; 428/524; 428/532
[58] Field of Search .............. 428/327, 209, 402, 497, 428/464, 457, 532, 332, 458, 204, 344, 354, 355, 524

[56] References Cited

U.S. PATENT DOCUMENTS

| | | | |
|---|---|---|---|
| 2,375,396 | 5/1945 | Watkins | 428/532 |
| 2,684,198 | 7/1954 | Oughton | 428/344 |
| 3,454,417 | 7/1969 | Pascale | 428/532 |
| 3,576,663 | 4/1971 | Signorino et al. | 428/532 |
| 3,809,568 | 5/1974 | Askew | 428/209 |
| 3,912,842 | 10/1975 | Swartz | 428/172 |
| 4,177,310 | 12/1979 | Steeves | 428/458 |
| 4,206,248 | 6/1980 | Schmidlin | 428/458 |

*Primary Examiner*—P. Ives
*Attorney, Agent, or Firm*—Brumbaugh, Graves, Donohue & Raymond

[57] ABSTRACT

The present invention relates to indirectly metallized labels for containers, such as bottles, coated with a lacquer that has been applied before metallizing, comprising 2 to 10 weight % (calculated on the amount of resin of said lacquer) of additives, which do not attack the metal of said labels and which are soluble in an aqueous caustic soda solution, containing 1.5 weight % of caustic soda, having a temperature of 80° C.

4 Claims, No Drawings

METALLIZED LABELS FOR CONTAINERS

The present invention relates to metallized labels for containers such as bottles, coated with a lacquer comprising 2 to 10 weight % (calculated on the amount of resin in said lacquer) of additives, which do not attack the metal of said labels and which are soluble in an aqueous caustic soda solution, containing 1.5 weight % of caustic soda, having a temperature of 80° C.

It is known that in the labelling industry there is a requirement for labels having a metallic appearance. It is obvious to use for this purpose a metallic foil. However, with respect to returnable bottles, such labels cannot be removed by using standard techniques, involving immersion in a bath of 1.5 weight % of caustic soda, having a temperature of 80° C., within a period of 3 minutes. Further in such a bath metallic foil labels react with caustic soda, due to which its strength is reduced such that the caustic soda has to be changed frequently.

For said reasons, it would be advantageous to use metallized papers for this purpose, since such papers have a low metal content in comparison with a metallic foil. Metallized papers are generally known. A very useful type is disclosed in DPA 80.00967 corresponding to U.S. patent application Ser. No. 137,945, filed Apr. 7, 1980, now U.S. Pat. No. 4,344,998, and commonly owned with this application. As with a foil label the requirements are the same, chiefly appearance and ease of removal in the above caustic soda solution. Lacquers, preferably acrylic resin based lacquers, are used to provide protection for the metallic layer against water and oxygen and also to enable the product to perform satisfactorily on labelling machines.

In order to enable a metallized label to be satisfactorily removed from a bottle, it is necessary that the hot caustic soda solution can attack the adhesive layer between bottle and paper. For this to occur within a relatively short time, the caustic soda has to rapidly reach the paper layer. That is to say it must rapidly pass through the lacquer and metallized layer. The latter problem is obviated with this invention in that a very thin layer of metal which has been vacuum deposited in the label construction will provide a low resistance to the hot dilute caustic soda solution.

There are two potential ways of achieving the desired penetration of the lacquer.
solubility of lacquer
thickness of lacquer The commercially available lacquers which are readily dissolved by dilute alkali are ideally suited for applications involving direct metallizing where the lacquer is applied after metallizing. However, the resultant products from direct metallizing have an inferior mirror reflectivity as compared with indirect metallized papers. Such lacquers, which are used for direct metallized labels are not suitable in the indirect process where the lacquer is applied before metallizing because the lacquer must have low volatiles at reduced pressures.

Lacquers soluble in dilute alkali and having low volatiles under reduced pressure are not commercially available.

It would be possible to employ a thin lacquer layer thereby allowing the caustic soda to reach the metallized layer by a permeation mechanism. This has appeared to be unsatisfactory. If the lacquer thickness is less than about 1.7 um, interference fringes may occur which detract from the end product's appearance.

It has been found, that metallized labels, glued to bottles by means of a glue that is not resistant to an aqueous caustic soda solution, containing 1.5% by weight of caustic soda, at a temperature of 80° C., may be removed within a period of 3 minutes from said bottles, by using labels coated with a lacquer wherein 2 to 10 weight % hot dilute alkali soluble additives that do not attack the metal layer of said label have been incorporated. When said additives have been dissolved in said alkaline solution, the lacquer coating starts to crack or to split and to swell. Subsequently the underlying metallic layer is dissolved and finally the paper substrate and glue (casein based) are attacked. Such additives may be dissolved and subsequently dispersed or directly ground into the lacquer. The preferred lacquers and techniques of manufacture are those used in DPA 80.00967. Preferably said additives are distributed in said lacquer at a particle size of up to 2 um.

Further it is preferred that said additives are Food and Drug Act (F.D.A.) approved.

Evidently it is preferred that said additives do not react with caustic soda and have a low vapor pressure.

In many cases it is preferred that said additives are colorless or clear.

Preferred additives are sugar-like materials such as sucrose, mannitol and urea. Also water based resins, including acrylic emulsions, polyvinylalcohols and polyacrylamides, substituted celluloses, such as nitrocellulose, carboxyethyl and carboxymethyl celluloses and ureaformaldehyde types (e.g. melamine) may similarly be included.

Further it is preferred that a paper is used which has been subjected to steam or conditioned at high humidity immediately prior to the laminating step described in DPA 80.00967. The resultant label has been found to give beneficial results with respect to processing at the printing and label application stages and with respect to ease of label removal from the container.

The mirror reflectivity of a sample surface can be measured by adhering a 150 mm×200 mm sample to a smooth flat glass surface. At an angle of 60° to the sample is placed a 150 mm×250 mm grid on which is marked 10 mm squares and numerals 1–25 in the vertical direction. The sample surface is illuminated by standard photographic lamps. A 5"×4" Micro Precision Products Technical Camera with a Schneider Xenar 1:4.5/150 lens and aperture F16 is situated 500 mm from the point of contact of grid and sample at an angle of 30° to sample. Then focus is on the reflected numeral 1 from the grid and a photograph is taken. The mirror reflectivity of the sample surface is determined by examination of the photograph to see the highest number at which a clear reflected image is obtained. This number gives the mirror reflectivity rating of the sample surface.

EXAMPLE 1

A lacquer solution was prepared by dissolving 100 parts by weight of Bakelite Vinyl Solution Resin VMCH in 300 parts by weight of butanone-2. The resultant lacquer solution was applied to the carrier film at a dry coating weight of 2.2 grams per square meter (gsm) using a drying temperature of 70° C.

A coherent continuous stratum of aluminium metal was then vapor deposited by standard methods upon the lacquer layer.

A layer of solvent based laminating adhesive Adcote 340, supplied by Morton Chemicals, is an alcohol dilutable two component laminating adhesive was applied to the metal layer at a dry coating weight of 2.4 gsm to bond the stratum of paper (Hescolina Base paper (60 gsm)) to the composite.

After 7 days the carrier film was stripped from the composite structure to produce a laminar product which had a reflectivity rating of 5, according to the method described in the text.

From the resultant laminar product was cut a 100 mm×100 mm label which was bonded to a glass bottle using a standard casein glue. After 7 days storage at ambient conditions the bottle plus label was immersed in a 1.5% aqueous caustic soda solution at 80° C.

The label failed to release after 25 minutes.

EXAMPLE 2

3.0 parts by weight of sucrose were dissolved in 9 parts of water and this solution was mixed into a lacquer solution comprising 100 parts by weight of Bakelite Vinyl Solution Resin VMCH, 300 parts by weight of butanone-2. The resultant lacquer solution was applied to a polypropylene carrier film at a dry coating weight of 2.4 gsm using a drying temperature of 70° C.

A coherent continuous stratum of aluminium metal was then vapor deposited by standard methods upon this lacquer layer.

7.5 parts by weight of sucrose were dissolved in 22.5 parts of water and this was mixed into a laminating adhesive solution comprising 100 parts of Adcote 340, 115 parts by weight of methanol and 15 parts of catalyst. The resultant laminating adhesive solution was applied to the metal layer at a dry coating weight of 30 gsm to bond the Hescolina Base Paper (60 gsm) to the composite.

After 7 days the carrier film was stripped from the composite structure to produce a laminar product which had a mirror reflectivity rating of 4, determined according to the method described in the text.

From the resultant laminar product was cut a 100 mm×100 mm label which was bonded to a glass bottle using a standard casein glue. After 7 days storage at ambient conditions the bottle plus label was immersed in a 1.5% aqueous caustic soda solution at 80° C.

The label released from the bottle after 7 minutes.

EXAMPLE 3

A lacquer solution was prepared by dissolving 70 parts by weight of Neocryl B811, supplied by Polyvinyl Chemie of Waalwijk, is an acrylic lacquer and 30 parts by weight of Vinnol H40/55, supplied by Wacker, is a copolymer of 60% vinyl chloride and 40% vinyl acetate; in 210 parts by weight of butanone-2 and 90 parts by weight of ethyl acetate.

The resultant lacquer was applied to the polyester carrier film at a dry coating weight of 2.5 gsm using a drying temperature of 70° C.

A coherent continuous stratum of aluminium metal was then vapor deposited by standard methods upon this lacquer surface.

A layer of an aqueous based styrene butadiene emulsion adhesive was applied to the metal layer at a dry coating weight of 4 gsm to bond the stratum of paper (Hescolina base paper (60 gsm)) to the composite.

After 7 days the carrier film was stripped from the composite structure to produce a laminar product with a mirror reflectivity of 5. From the resultant laminar product was cut a 100 mm×100 mm label which was bonded to a glass bottle using a standard casein glue.

After 7 days storage at ambient conditions, the bottle plus label was immersed in a 1.5% caustic soda solution at 80° C.

The label released from the bottle after 14 minutes.

EXAMPLE 4

As example 3 but 3 parts by weight of sucrose dissolved in 9 parts by weight of water were added to the lacquer.

Mirror reflectivity rating of 4.

The label removal time was 3.5 minutes.

EXAMPLE 5

As example 3 but 3 parts by weight of sucrose were ground into the lacquer.

Mirror reflectivity rating of 5.

The label removal time was 158 seconds.

EXAMPLE 6

As example 3 but 5 parts by weight of dextrose monohydrate were ground into the lacquer.

Mirror reflectivity rating of 4.

The label removal time was 130 seconds.

EXAMPLE 7

As example 3 but 7 parts by weight of sucrose were ground into the lacquer.

Mirror reflectivity rating of 4.

The label removal time was 220 seconds.

EXAMPLE 8

A lacquer solution was prepared by dissolving 75 parts by weight of Neocryl B 811 and 25 parts by weight of Vinnol H 40/55 in 210 parts by weight of butanone-2 and 90 parts by weight of ethyl acetate. To this solution were added 3 parts by weight of sucrose dissolved in 9 parts by weight of water. The resultant lacquer solution was applied to the polyester carrier film at a dry coating weight of 2.6 gsm using a drying temperature of 70° C.

Then as example 3.

Mirror reflectivity 4.

The label released from the bottle after 105 seconds.

EXAMPLE 9

As example 8 but 5 parts by weight of sucrose were ground into the lacquer.

Mirror reflectivity 4.

The label released from the bottle after 95 seconds.

EXAMPLE 10

A lacquer solution was prepared by dissolving 80 parts by weight of Neocryl B 811 and 20 parts by weight of Vinnol H 40/55 in 210 parts by weight of butanone-2 and 90 parts by weight of ethyl acetate. To this solution were added 5 parts by weight of sucrose dissolved in 15 parts by weight of water. The resultant lacquer solution was applied to the polyester carrier film at a dry coating weight of 2.6 gsm using a drying temperature of 70° C.

Then as example 3.

Mirror reflectivity 4.

The label released from the bottle after 115 seconds.

EXAMPLE 11

As example 10 but 5 parts by weight of sucrose were ground into the lacquer.
Mirror reflectivity 5.
The label removal time was 96 seconds.

EXAMPLE 12

A lacquer solution was prepared by dissolving 80 parts by weight of Neocryl B 811 and 20 parts by weight of Vinnol H 40/55 in 210 parts by weight of butanone-2 and 90 parts by weight of ethyl acetate. To this solution was added 10 parts by weight of Neocryl BT21 which is an emulsion in water. Neocryl BT21, supplied by Polyvinyl Chemie, is an alkaline soluble pure acrylic copolymer. The resultant lacquer solution was applied to a polyester carrier film at a dry coating weight of 1.7 gsm using a drying temperature of 80° C.

A coherent continuous stratum of aluminum metal was then vapor deposited by standard methods upon this lacquer surface.

A layer of an aqueous based styrene butadiene adhesive was applied to the metal layer at a dry coating weight of 4 gsm to bond the stratum of paper (Hescolina base paper 60 gsm which had been subjected to steam at 20 psi for 10 seconds) to the composite.

After 7 days the carrier film was stripped from the composite structure to produce a laminar product.
Then as example 3.
Mirror reflectivity 4.
The label removal time was 150 seconds.

EXAMPLE 13

A lacquer solution was prepared by dissolving 80 parts by weight of Neocryl B 811 and 20 parts by weight of Vinnol H 40/55 in 210 parts by weight of butanone-2 and 90 parts by weight of ethyl acetate. To this solution was added 5 parts by weight of polyvinyl-alcohol Poval 105, dissolved in 25 parts of water.

The resultant lacquer solution was applied to a polyester carrier film at a dry coating weight of 1.7 gsm using a drying temperature of 80° C.

A coherent continuous stratum of aluminum metal was then vapor deposited by standard methods upon this lacquer surface.

A layer of an aqueous based styrene butadiene adhesive was applied to the metal layer at a dry coating weight of 4 gsm to bond the stratum of paper (Hescoline base paper 60 gsm which had been subjected to steam at 20 psi for 10 seconds) to the composite.

After 7 days the carrier film was stripped from the composite structure to produce a laminar product.
Then as example 3.
The resultant laminar product had a mirror reflectivity of 5 and the label released from the bottle after 160 seconds.

EXAMPLE 14

A lacquer solution was prepared by dissolving 80 parts by weight of Neocryl B 811 and 20 parts by weight of Vinnol H 40/55 in 210 parts by weight of butanone-2 and 90 parts by weight of ethyl acetate. To this solution was added 10 parts by weight of Neocryl BT21 (ex Polyvinyl Chemie) which is an emulsion in water.

The resultant lacquer solution was applied to a polyester carrier film at a dry coating weight of 1.7 gsm using a drying temperature of 80° C.

A coherent continuous stratum of aluminum metal was then vapor deposited by standard methods upon this lacquer surface.

A layer of an aqueous based styrene butadiene adhesive was applied to the metal layer at a dry coating weight of 4 gsm to bond the substrate (Hescolina base paper 60 gsm, that had not been subjected to a steam treatment) to the composite.

After 7 days the carrier film was stripped from the composite structure to produce a laminar product.
Then as example 3.
The product had a reflectivity of 6 and the label released from the bottle after 160 seconds.

I claim:

1. A metallized label for containers including bottles which comprises a coating of lacquer, containing 2 to 10% by weight of an additive, wherein said percentage is calculated on the amount of resin in the lacquer and wherein said additive is soluble in an aqueous caustic soda solution containing 1.5% by weight of caustic soda, heated at 80° C.; a stratum of metal deposited upon the lacquer coating, wherein said lacquer does not attack the metal stratum of said label; a laminating adhesive; a stratum of paper and an adhesive.

2. The label according to claim 1 wherein said additive has a particle size of up to 2μm.

3. The label according to claim 1 wherein said additive does not react with caustic soda.

4. The label according to claim 1 wherein said additive is selected from the group consisting of sucrose, mannitol, urea, and water based resins.

* * * * *